(12) United States Patent
Hassan et al.

(10) Patent No.: US 11,459,461 B2
(45) Date of Patent: Oct. 4, 2022

(54) SELF-HEALING AND REJUVENATING MATERIALS FOR ASPHALT MIXTURES

(71) Applicant: Board of Supervisors of Louisiana State University and Agricultural and Mechanical College, Baton Rouge, LA (US)

(72) Inventors: Marwa Hassan, Baton Rouge, LA (US); Max Abelardo Aguirre Deras, Baton Rouge, LA (US)

(73) Assignee: Board of Supervisors of Lousiana State University, Baton Rouge, LA (US)

( * ) Notice: Subject to any disclaimer, the term of this patent is extended or adjusted under 35 U.S.C. 154(b) by 0 days.

(21) Appl. No.: 16/838,411

(22) Filed: Apr. 2, 2020

(65) Prior Publication Data

US 2020/0317925 A1    Oct. 8, 2020

Related U.S. Application Data

(60) Provisional application No. 62/828,237, filed on Apr. 2, 2019.

(51) Int. Cl.
| | |
|---|---|
| *C08L 95/00* | (2006.01) |
| *C08L 5/04* | (2006.01) |
| *C08L 91/00* | (2006.01) |
| *C08K 5/00* | (2006.01) |

(52) U.S. Cl.
CPC ............ *C08L 95/00* (2013.01); *C08K 5/0016* (2013.01); *C08L 5/04* (2013.01); *C08L 91/00* (2013.01); *C08L 2555/34* (2013.01)

(58) Field of Classification Search
CPC ....................................................... C08L 95/00
See application file for complete search history.

(56) References Cited

U.S. PATENT DOCUMENTS

2012/0040093 A1*  2/2012  DeBrouse ............... C04B 28/02
                                                           427/201

OTHER PUBLICATIONS

Tabakovic, et al. ("An Evaluation of the Efficiency of Compartmented Alginate Fibers Encapsulating a Rejuvenator as an Asphalt Pavement Healing System", Applied Sciences, 2017, 7, 1-6) (Year: 2017).*
Tabakovic, et al. ("The Reinforcement and Healing of Asphalt Mastic Mixtures by Rejuvenator Encapsulation in Alginate Compartmented Fibres", Smart Materials and Structures, 25, 2016). (Year: 2016).*
AASHTO Designation: T 315-12, Determining the Rheological Properties of Asphalt Binder Using a Dynamic Shear Rheometer (DSR) (2012).
AASHTO Designation: T 350-14-1, Technical Section: 2b, Liquid Asphalt, Multiple Stress Creep Recovery (MSCR) Test of Asphalt Binder Using a Dynamic Shear Rheometer (DSR) (2018).

(Continued)

*Primary Examiner* — Arrie L Reuther
(74) *Attorney, Agent, or Firm* — Thomas|Horstemeyer, LLP

(57) ABSTRACT

Asphalt rejuvenating fibers and asphalt rejuvenation materials for self-healing asphalt applications are provided. The asphalt rejuvenating fibers can include a shell surrounding a hollow space. The shell can include alginate salts, an emulsifier, and a plasticizer. The asphalt rejuvenation materials can include the asphalt rejuvenating, an asphalt binder, and aggregate blends.

16 Claims, 8 Drawing Sheets

(56) References Cited

OTHER PUBLICATIONS

AASHTO Designation: M320-10, Performance—Graded Asphalt Binder (2012).
AASHTO Designation: T 316-11, Viscosity Determination of Asphalt Binder Using Rotational Viscometer (2012).
AASHTO Designation: T 313-12, Determining the Flexural Creep Stiffness of Asphalt Binder Using the Bending Beam Rheometer (BBR) (2012).
Aguirre, M, Hassan, M, Shirzad, S., Cooper, S., Mohammad, L, and Negulescu, I, (2019) "Laboratory Testing of Self-Healing Fibers in Asphalt Mixtures Prepared with Recycled Materials." Journal of Transportation Research Record (TRR), vol. 2673 Issue 4, 513-523, DOI: 10.1177/0361198119836978: 1-11.
Aguirre, M, Hassan, M., Shirzad, S., Cooper, S., Negulescu, I., and Mohammad, L., (2020) "Evaluation of Hollow-Fibers Encapsulating a Rejuvenator in Asphalt Binder with Recycled Asphalt Shingles." International Journal of Pavement Research and Technology, https://doi.org/10.1007/s42947-019-0090-4.

* cited by examiner

SELF-HEALING AND REJUVENATING MATERIALS FOR ASPHALT MIXTURES

CROSS-REFERENCE TO RELATED APPLICATIONS

This application claims the benefit of and priority to U.S. Provisional Application Ser. No. 62/828,237, having the title "SELF-HEALING AND REJUVENATING MATERIALS FOR ASPHALT MIXTURES", filed on Apr. 2, 2019, the disclosure of which is incorporated herein by reference in its entirety.

STATEMENT REGARDING FEDERALLY SPONSORED RESEARCH OR DEVELOPMENT

This invention was made with Government support under contract DOT 69A3551747106 awarded by the US Department of Transportation. The Government has certain rights in the invention.

BACKGROUND

Hot-Mix Asphalt (HMA) is susceptible to deterioration and cracking damage during its service life due to aging, traffic and/or environmental loading. Like human skin, asphalt mixture has an inherent tendency to eventually close the cracks when subjected to an appropriate rest period and as a result, the mixture is healed by recovering its strength and stiffness. However, this healing efficiency decreases considerably due to the aging of the mixture with time. Therefore, enhancing the healing capacity of asphalt mixture through an internal system rather than conventional pavement rehabilitation activities can substantially reduce traffic disruption, maintenance cost, and eventually prolong the service life of the pavement structure.

The use of recycled materials such as Recycled Asphalt Shingles (RAS) and Recycled Asphalt Pavement (RAP) in Hot-Mix Asphalt (HMA) has increased in the last decade due to the rising cost of petroleum-based products and the negative environmental impacts from carbon emissions associated with the production of asphalt binder. However, the main challenge of incorporating recycled materials in asphalt mixtures is the aged binder that increases the cracking susceptibility of the mix. Therefore, the aged binder in RAS and RAP tends to limit high content of recycled materials in the mix. The need to reverse the negative effects of recycled materials in HMA motivates researchers to identify and implement innovative and tenable approaches. These needs and other needs are satisfied by the present disclosure.

SUMMARY

Embodiments of the present disclosure provide for materials for asphalt rejuvenation and self-healing, products including asphalt rejuvenation and self-healing materials, and the like.

An embodiment of the present disclosure includes asphalt rejuvenating fibers that include a shell surrounding a hollow space. The shell can include one or more alginate salts, an emulsifier, and a plasticizer.

An embodiment of the present disclosure also includes asphalt rejuvenation self-healing mixtures, that can include asphalt rejuvenating fibers as above, an asphalt binder, and aggregate blends.

Other compositions, methods, features, and advantages will be or become apparent to one with skill in the art upon examination of the following drawings and detailed description. It is intended that all such additional compositions, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

Figures &A-7B illustrate fracture resistance of HMA mixtures in accordance with embodiments of the present disclosure.

Figure 1:
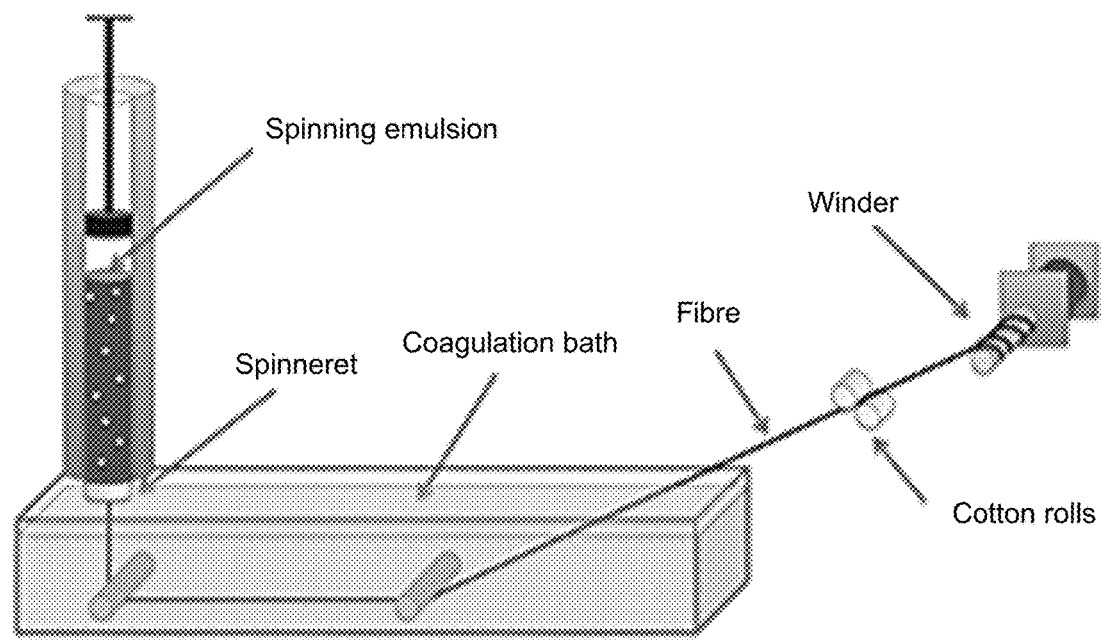
FIG. 1 is a diagram of an example of a wet spinning plot line (Mookhoek et al. 2012).

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of engineering, material science, and the like, which are within the skill of the art.

The following examples are put forth so as to provide those of ordinary skill in the art with a complete disclosure and description of how to perform the methods and use the materials disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

Acronyms and Abbreviations
AASHTO American Association of State Highway and Transportation Officials
ASTM American Society for Testing Materials
$CaCl_2.6H_2O$ Calcium Chloride Hexahydrate
$Cw_0$ Initial Crack width (mm)
$Cw_t$ Crack width at the time of analysis (mm)
DCB O-Dichlorobenzene
DI De-Ionized
DSR Dynamic Shear Rheometer
$H_e$ Healing efficiency (%);
HMA Hot-Mix Asphalt
IDT Indirect Tensile Test
ITS Indirect Tensile Strength
Jc-value Critical Strain Energy Release Rate
LAS Linear Amplitude Sweep Test
LTRC Louisiana Transportation Research Center
MSCR Multiple Stress Creep Recovery
NMAS Nominal Maximum Aggregate Size
PEMA Ethylene-Alt-Maleic-Anhydride
RAP Recycled Asphalt Pavement
RAS Recycled Asphalt Shingles
SBS Styrene Butadiene Styrene
SCB Semi-Circular Bending
TGA Thermal Gravimetric Analysis
Tran-SET Transportation Consortium of South-Central States
UTS Ultimate Tensile Strength
VDOT Virginia Department of Transportation
3PB 3 point-bending General Discussion In accordance with the purpose(s) of the present disclosure, as embodied and broadly described herein, embodiments of the present disclosure, in some aspects, relate to asphalt rejuvenating fibers and asphalt rejuvenating materials.

In general, embodiments of the present disclosure provide for methods of making asphalt rejuvenating fibers, asphalt rejuvenating materials, compositions including asphalt rejuvenating materials, and products including asphalt rejuvenating materials.

The present disclosure includes asphalt rejuvenating fibers. Advantageously, the fibers act as a delivery method to allow asphalt rejuvenators to reach and be distributed within an asphalt product, such as pavement or shingles. The asphalt rejuvenating fibers have elastic properties that can enhance the elasticity of asphalt mixes. The asphalt rejuvenating fibers can enhance the self-healing and rejuvenation of asphalt mixes used in asphalt products, including but not limited to pavements and shingles.

Embodiments of the present disclosure include asphalt rejuvenating fibers as above, where the fibers include a shell surrounding a hollow space. The shell can include an alginate salt such as sodium alginate, calcium alginate, or a combination thereof. The shell can also include an emulsifier and/or a plasticizer.

In various embodiments, the shell can encapsulate a core material that includes a rejuvenator. The rejuvenator can be an oil such as an aromatic oil, a bio-oil or a synthetic product. The bio-oil can be e.g., sunflower oil, algae, wood, plant extracts, bio-waste or combinations thereof. Synthetic rejuvenators can include Anova™ asphalt rejuvenators, BIG A Asphalt Mix Renew™, Reclamite® 1 asphalt rejuvenator, among others, as can be appreciated by one of ordinary skill in the art. In various embodiments of the present disclosure, the rejuvenator can be a commercial product designed to restore original properties to aged (oxidized) asphalt binders by restoring its original ratio of asphaltenes to maltenes. In some embodiments, the rejuvenator can be derived from chemically modified vegetable oils. In some embodiments, the rejuvenator can be a maltene-based cationic petroleum emulsion.

In various embodiments, the core material can include an emulsifier. The emulsifier can be the same or different from the emulsifier included in the shell material. In some embodiments, the emulsifier can include poly(ethylene-alt-maleic anhydride).

In various embodiments, the ratio of core material to shell can be from about 1:1.5 to 3:1 by weight.

In various embodiments, the shell can include about 3% to 10% of an alginate salt, about 4% to 10%, or about 5% by weight (e.g. sodium alginate, calcium alginate, or a combination thereof.

In various embodiments, the shell can include about 30% to 50% emulsifier content, or about 40% emulsifier content. The emulsifier can include e.g. poly(ethylene-alt-maleic anhydride), poly(olefin-maleic anhydride), poly(olefin-maleic acid), poly(acrylic acid), poly(isobutylene-alt-maleic anhydride), styrene-maleic anhydride, or combinations thereof.

In various embodiments, the shell can include about 10% to 40% plasticizer content. The plasticizer can include e.g. polyethylene glycol, glycerin, polyethylene glycol monomethyl ether, propylene glycol, sorbitol sorbitan solution, cellulose acetate, and combinations thereof.

In various embodiments, the asphalt rejuvenating fibers can have a mean fiber diameter of about 25 µm to 450 µm, about 50 µm to 300 µm, or about 25 µm to 150 µm. The fibers can be long or short, depending on the use. The fibers, for example, can be from about 5 mm to 70 mm long.

Embodiments of the present disclosure also include asphalt rejuvenation mixtures and materials, or products including the asphalt rejuvenating fibers as described above. Advantageously, the asphalt rejuvenation materials can exhibit self-healing properties. The asphalt rejuvenation materials can be a mixture. The asphalt rejuvenation mixtures and materials can also include a binder. In an aspect the binder can be a virgin binder, meaning a binder that has not been used or recycled previously. In various embodiments, the virgin binder can be PG 64-22, PG 67-22, and polymer-modified PG 70-22 or any other binder that is in compliance with Superpave™ specifications (US Federal Highway Administration) and that can assist in restoring the original ratio of asphaltene to maltene in the binder blend. The binder designations indicate the ideal temperature range for performance, for example PG 67-22 will perform well during high temperatures of 67 Celcius and low temperatures of −22 Celsius during its service life.

In various embodiments, the asphalt rejuvenation material can include about 1% to 40% asphalt rejuvenating fibers by weight of binder.

In various embodiments, the asphalt rejuvenation material can include a mixture of asphalt rejuvenating fibers, aggregate or aggregate blends, and binder, where the asphalt rejuvenating fibers can be about 0.3% to 5% of the mixture weight.

Asphalt, in general, is a bitumen-based product. Asphalt, as used herein, can include pure asphalt or asphalt-containing mixtures as will be readily understood by one of ordinary skill in the art.

In various embodiments, the asphalt rejuvenation material can be included in Recycled Asphalt Shingles or Recycled Asphalt Pavement.

EXAMPLES

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Self-healing is an emerging technology that is used to reverse the aging process in asphalt mixtures (Tabaković et al. 2017). This smart self-healing technology has the potential to bring revolution in conventional pavement construction and maintenance methods (Zhang et al. 2018). There are two main self-healing techniques that were evaluated by the researchers, which are induction healing and rejuvenation (Shu et al. 2019). Induction healing is quite effective in crack healing but the heat increase in this process to soften the binder also simultaneously ages the binder (Xu et al. 2018). Rejuvenation is the application of recycling-agents or rejuvenators to reverse the hardening of the asphalt mixture by restoring the asphaltene-to-maltene ratio (Hassan and Aguirre 2018). However, simply applying a recycling-agent on the pavement surface causes inadequate penetration (only up to 20 mm from the surface) and minimizes the probability of healing cracks at the bottom of the layers (Shen et al. 2007). That is why the encapsulation of a healing agent by a polymer as a shell material and applying it during the mixing process has drawn interests because of its "crack response ability" (Shu et al. 2019).

When there is an encapsulated rejuvenator in the crack propagation path, the fracture energy at the tip of the crack causes the capsule to rupture. It disperses the rejuvenator that gradually diffuses into the binder by capillary action, fills the crack, and gradually restores the asphaltene-to-maltene ratio. Rejuvenator can also restore the light components that are lost during service (Garcia et al. 2016; Tabaković et al. 2016). The diffusion of rejuvenator can lower the viscosity of asphalt binder around the cracks and enhance its rheological properties (Garcia et al. 2010). Furthermore, the addition of rejuvenators in asphalt mixtures containing Reclaimed Asphalt Pavement (RAP) may enhance the mixing of the aged and virgin binders and softens the aged binder (Brown 1988).

There are several methods of encapsulating the rejuvenators as core materials, i.e., melamine-formaldehyde (MMF) modified microcapsules (Su et al. 2013), epoxy microcapsules (Garcia et al. 2011), and hollow alginate fibers (Tabaković et al. 2016). Researchers found that MMF modified microcapsules pose a threat to the environment due to the use of formaldehyde in high concentration and epoxy microcapsules can withstand high mixing and compaction temperature, but their breaking is hard to control (Xu et al. 2018). Moreover, the addition of rejuvenators can reduce the stiffness of HMA resulting in an increase in rutting potential (Garcia et al. 2015). This undesirable drop in stiffness can be eliminated by substituting microcapsules with alginate fibers that only rupture when cracking occurs (Aguirre et al. 2018). Hollow alginate fibers have been shown to be an effective material for encapsulating the rejuvenators because they are inexpensive, environmentally-friendly, exhibit adequate thermal and mechanical stability, and possess the ability to self-degrade when exposed to air (Xu et al. 2018).

Researchers have investigated the effect of alginate fibers when used with asphalt mixture to enhance its mechanical properties and self-healing potential. Tabakovic et al. (2017) incorporated 5% calcium-alginate fibers in an asphalt mixture and determined its healing efficiency using the Indirect Tensile (IDT) test. The healing efficiency, initial strength, and healed strengths were compared with a conventional mixture at different healing periods. It was concluded that the initial strength of the mixture without fibers was higher than the mixture with fibers. However, the mixture with fibers exhibited a higher Indirect Tensile Strength (ITS) than the mixture without fibers after the first healing period.

Tabakovic et al. (2017) also synthesized calcium-alginate fibers encapsulating Modesel R20 and conducted a self-healing experiment by performing the Indirect Tensile Stiffness Modulus (ITSM) and Indirect Tensile Strength (ITS) tests. Although the addition of fibers enhanced the initial strength of asphalt mixtures, it reduced the healing capacity of the mixtures as compared to the mixtures having no fibers. Hassan and Aguirre (2018) conducted an experimental program to assess the healing capabilities of sodium alginate fibers containing Rejuvn8 in asphalt mixtures with various binders and recycled materials. It was found that the success of this healing approach is dependent on fiber breakage. The rejuvenator is released when the fibers break properly, which softens the binder. On the other hand, when fibers do not break, they make the mixture stiffer. Aguirre et al. (2019) also evaluated sodium alginate fibers encapsulating green bio-oil product as a recycling agent to mixtures with recycled materials and determined the healing efficiency using a 3-Point-Bending (3PB) setup. It was concluded that the incorporation of fibers increased the strength recovery when the mixtures were prepared with an unmodified PG64-22 binder. The semi-circular bending (SCB) test results showed that fibers increased the resistance to fracture at intermediate temperature for the mixtures prepared with recycled materials.

The experiments resulting in the materials and methods described in the present example achieved several objectives. Two types of sodium alginate fibers encapsulating two different rejuvenators and optimizing the production parameters were synthesized. The self-healing efficiency and strength recovery efficiency of the asphalt mixtures containing fibers through a self-healing experiment were evaluated. The fracture resistance of the asphalt mixtures at intermediate temperature was determined, and the rutting and fatigue behavior of extracted asphalt binders through a series of binder rheological tests was characterized. Unlike the previous work, the materials and methods described in the present disclosure provide for improved self-healing and rejuvenation. The materials and methods provided for herein, unlike previous materials, can provide self-healing and rejuvenation. The materials described herein include numerous important features that contribute to these capabilities. The materials have hollow fibers, rather than compartmented fibers. The ratios of the components and specific material selection also result in successful self-healing and rejuvenation. Additionally, the methods used to produce the fibers resulted in fibers with improved characteristics.

EXPERIMENTAL PROGRAM

The experimental program in this study was grouped into the production and optimization of sodium alginate fibers, asphalt mixture preparation, self-healing experiment, asphalt mixture testing, statistical analysis, and binder testing as described in the following sections.

Synthesis and Optimization of the Sodium Alginate Fibers Containing Rejuvenators Materials The materials used for the synthesis of sodium alginate fibers included sodium alginate, rejuvenating material, a polymeric surfactant solution (i.e., Poly(ethyl methacrylate) or PEMA), ethylene glycol, and calcium chloride hexahydrate ($CaCl_2.6H_2O$). Sodium alginate was used as a shell material. Two synthetic oil-based commercial rejuvenator products, Cargill-1252, and Cargill-1253, were used as core materials to prepare two different fiber types. Cargill-1252 and Cargill-1253 were selected because these two rejuvenators exhibit good compatibility with asphalt binder (Aguirre et al. 2017). Moreover, these two rejuvenators demonstrated higher efficiency in restoring the asphaltene-to-maltene ratio of the aged binder and can also enhance the low-temperature properties of the oxidized binder as reported by Aguirre et al. (Aguirre et al. 2017). PEMA was added to stabilize the healing solution. Ethylene glycol was used as a plasticizer to enhance the thermal stability of the fibers. Additionally, $CaCl_2.6H_2O$ was used to prepare a 0.6 M solution, which functioned as a coagulation bath for extruding the resulting emulsion and to produce sodium alginate fibers.

Procedure of Synthesis

The synthesis procedure of the fibers was adopted and modified from the production procedure of fibers encapsulating o-dichlorobenzene (DCB) developed by Mookhoek et al. (2012). 21 g of sodium alginate was mixed with 350 ml of de-ionized water at 25° C. with a high shear impeller for 30 minutes to produce 6% by weight sodium alginate solution. A 2.5% solution of PEMA was prepared by adding it in water at 70° C., blending it for 60 minutes, and then cooling it to room temperature. After that, different percentages of PEMA were mixed with the rejuvenator to prepare the healing solution. It was added to the sodium alginate solution at various rejuvenator-to-sodium alginate ratios at 40 rpm for 20 seconds to form an emulsion, which was ejected into the coagulation bath through a 100-ml syringe with an 18-gauge straight-cut needle. The fibers produced were spun under slight tension, close to the rate of extrusion, on a plastic bobbin using a small-scale wet spinning pilot line as shown in FIG. 1. The wet spinning plot line consisted of a motor-controlled plunger-extruder and a filament winder. The plunger-extruder was used for ejecting the emulsion into the bath through the needle while the filament winder coiled fibers around the bobbin. The bobbins containing fibers were kept inside a fume-hood under air exposure at room temperature for 48 hours so that the fibers are dry enough prior to testing. After drying, the average diameter measured by an optical light microscope was 0.62 mm.

Optimization of the Production Parameters

The optimization procedure for sodium alginate fibers encapsulating rejuvenators was adopted from Hassan and Aguirre (2018). Its aim was to optimize fiber production parameters and selecting a fiber having satisfactory thermal stability and mechanical strength to withstand harsh environment during the mixing and production phases of asphalt mixtures. Table 1 shows the test matrix used for the optimization of the production parameters. Eleven fibers with Cargill-1252 and eleven fibers with Cargill-1253 were successfully prepared by changing the rejuvenator to shell material ratio, emulsifier content, and plasticizer content.

Three different ratios of the rejuvenator to encapsulating material (i.e., 1:1.5, 2:1, and 3:1) were assumed to assess the effect of changing the amount of rejuvenator used on both tensile strength and thermal stability of the fibers. Furthermore, three different percentages of PEMA (i.e., 30%, 40%, and 50%) were utilized to evaluate the stability of the healing solution consisting of core and shell materials. Finally, four different percentages of polyethylene glycol (i.e., 10%, 20%, 30%, and 40%) were used to quantify its effect on the thermal stability of the fibers when added to the healing solution. The thermal stability of the fibers was evaluated by a Thermogravimetric Analysis (TGA) while the mechanical strength was evaluated by a tensile strength test.

TABLE 1

Experimental Matrix for the Optimization of Fibers' Synthesis.

| Sample ID | | | | |
|---|---|---|---|---|
| Fibers with Cargill 1252 | Fibers with Shell Material 1253 | Rejuvenator to Content Ratio | Emulsifier Content (%) | Plasticizer (%) |
| Fiber1-1 | Fiber2-1 | 1:1.5 | 30 | — |
| Fiber1-2 | Fiber2-2 | 1:1.5 | 40 | — |
| Fiber1-3 | Fiber2-3 | 1:1.5 | 50 | — |
| Fiber1-4 | Fiber2-4 | 1:1.5 | 30 | 10 |
| Fiber1-5 | Fiber2-5 | 1:1.5 | 30 | 20 |
| Fiber1-6 | Fiber2-6 | 1:1.5 | 30 | 30 |
| Fiber1-7 | Fiber2-7 | 1:1.5 | 30 | 40 |
| Fiber1-8 | Fiber2-8 | 2:1 | 30 | 10 |
| Fiber1-9 | Fiber2-9 | 2:1 | 30 | 40 |
| Fiber1-10 | Fiber2-10 | 3:1 | 30 | 10 |
| Fiber1-11 | Fiber2-11 | 3:1 | 30 | 40 |

Thermogravimetric Analysis

When the fibers are added to the mixtures, it is essential for the fibers to possess sufficient thermal stability so that their degradation due to high mixing temperature (i.e., 163° C.) is minimized. In this study, the stability of the fibers at high mixing temperature was assessed using a Thermogravimetric Analysis. The TGA procedure involves elevating the temperature of the produced fibers from room temperature (25° C.) to 600° C. at a rate of 10.0° C./min and measuring the weight retained as a percentage of the initial weight at a reference temperature, 163° C.

Tensile Strength

Figure 2A:
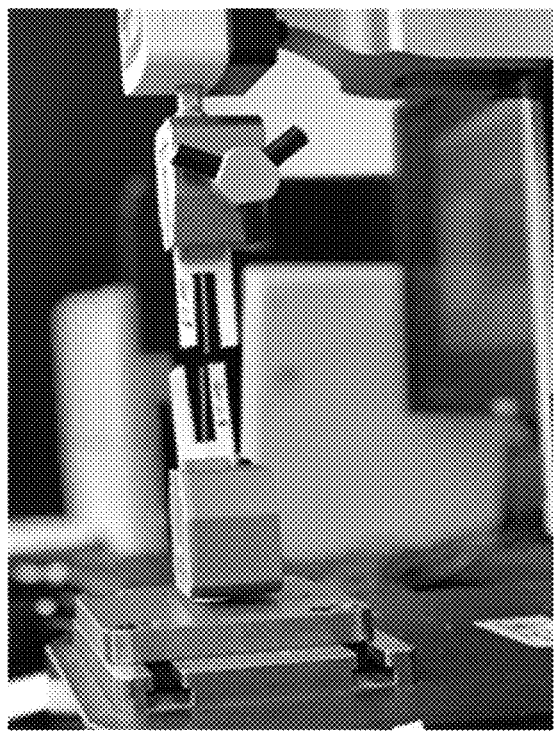
FIGS. 2A-2B are examples of a tensile strength test setup in accordance with embodiments of the present disclosure, (FIG. 2A) pull-out testing system, and (FIG. 2B) custom paper window.
Figure 2B:
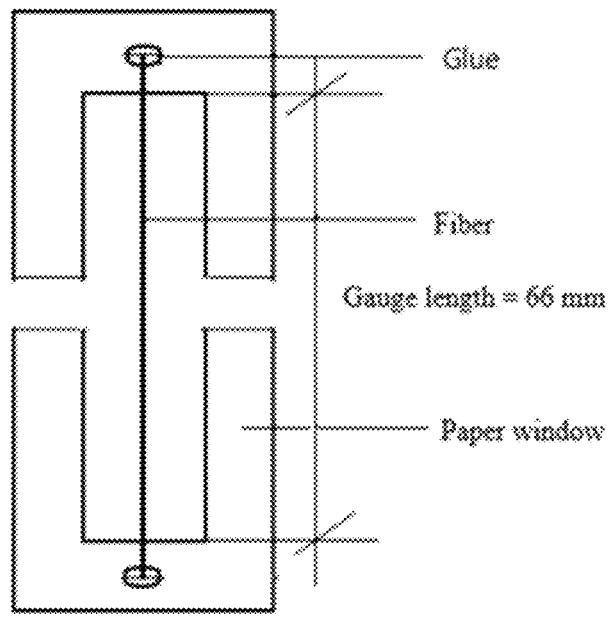

The prepared sodium alginate fibers were tested under uniaxial tension by a pullout testing system (FIG. 2A) for measuring their average Ultimate Tensile Strength (UTS). The testing setup had a 50 N load cell and the crosshead movement rate was 5 mm/s to simulate the pullout action on the fibers. The fibers, having a length of 68 mm, were attached to a custom paper window having 66 mm gauge length (FIG. 2B) using super glue in a way that there was no deformation outside the window gauge. This paper window was used to align the fibers with the test setup. The paper window with fiber attached to it was clamped with the crosshead through two fixed grips and cut in the middle perpendicular to the direction of the fiber to avoid any preload on the fiber. The pullout test was performed at a rate of 5 mm/s until the fibers broke in the middle and the UTS for each fiber was measured.

Preparation of Hot-Mix Asphalt (HMA) Mixtures

Two different binders that are commonly used in Louisiana (i.e., an unmodified PG 67-22 and an SBS polymer-modified PG 70-22M) were selected to prepare eight Superpave asphalt mixtures as shown in Table 2. The mixtures were prepared according to AASHTO R 35 (2017), AASHTO M 323 (2017), and Section 502 of the Louisiana Standard Specifications for Roads and Bridges (LaDOTD 2016). A Level 2 design ($N_{initial}=8$, $N_{design}=100$, $N_{final}=160$ gyrations) was adopted in this study. The aggregate stockpiles selected for mixture preparation included 5/8 Cr. gravel, 1/2 Cr. gravel, fine sand, and coarse sand to produce mixtures with a 12.5-mm nominal maximum aggregate size (NMAS). An optimum asphalt content of 5.5% was obtained so that the volumetric and densification requirements were met. Sodium alginate fibers were cut in small pieces before adding to the mixtures such that the length of the fibers was less than 1 mm. Fibers were added to six of the mixtures at three different percentages (i.e., 5%, 10% and 15% of the weight of asphalt binder) during mixtures' preparation. It is worth noting that no RAP was used in the mixtures to minimize variability and to focus the experimental program on the fibers' effect on the mixture performance.

TABLE 2

Test Matrix for Self-Healing Experiment and Performance Tests.

| Mixture | Asphalt Binder | Fiber Content | Self-Healing Experiment Healing Efficiency | Environmental Curing Condition | | Mixture Testing SCB |
|---|---|---|---|---|---|---|
| | | | | Room temperature (25° C.) | High temperature (50° C.) | |
| 67CO | PG 67-22 | — | x | 3 Specimens | 3 Specimens | x |
| 70CO | PG 70-22 | — | x | 3 Specimens | 3 Specimens | x |
| 67PG5F1-2 | PG 67-22 | 5% | x | 3 Specimens | 3 Specimens | x |
| 67PG10F1-2 | PG 67-22 | 10% | x | 3 Specimens | 3 Specimens | x |
| 67PG15F1-2 | PG 67-22 | 15% | x | 3 Specimens | 3 Specimens | x |
| 67PG5F2-2 | PG 67-22 | 5% | x | 3 Specimens | 3 Specimens | x |
| 67PG10F2-2 | PG 67-22 | 10% | x | 3 Specimens | 3 Specimens | x |
| 67PG15F2-2 | PG 67-22 | 15% | x | 3 Specimens | 3 Specimens | x |

Note:
x = Test performed

Self-Healing Experiment

Figure 3A:
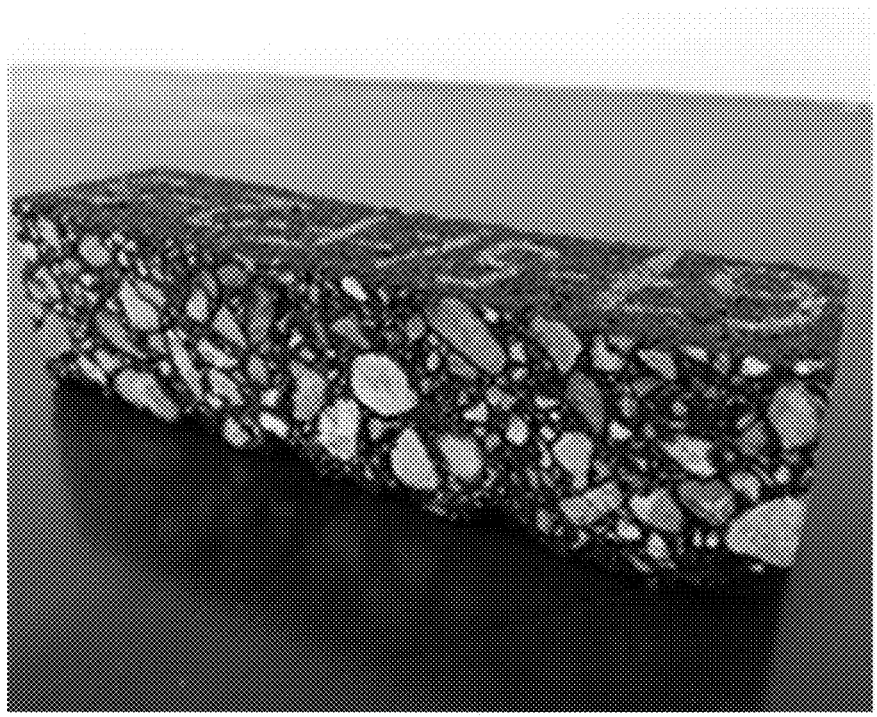
FIGS. 3A-3B illustrate the self-healing experiment in accordance with embodiments of the present disclosure, (FIG. 3A) asphalt concrete specimen prepared for self-healing experiment, and (FIG. 3B) 3PB test setup.

The test matrix for the self-healing experiment is presented in Table 2. The naming convention used in column 1 denotes the binder type, percentage of fibers in the mixture, and the fiber type. For example, 67CO is a control mixture using PG 67-22 with no fibers. 67PG15F1-2 denotes 67-22 binder mixed with 15% fibers of type 1-2. Fiber types are discussed in reference to Table 1, above. For each mixture, a 260.8 mm×320.3 mm×47 mm rectangular slab was compacted from which six rectangular beam specimens with dimensions of 40 mm×40 mm×160 mm (FIG. 3A) were sawed. Among the six beam specimens, three were healed at room temperature (i.e., 25° C.) and the rest were healed at high temperature (i.e., 50° C.) after testing. All the beams had an air void of 7.0±0.5%.

Figure 3B:
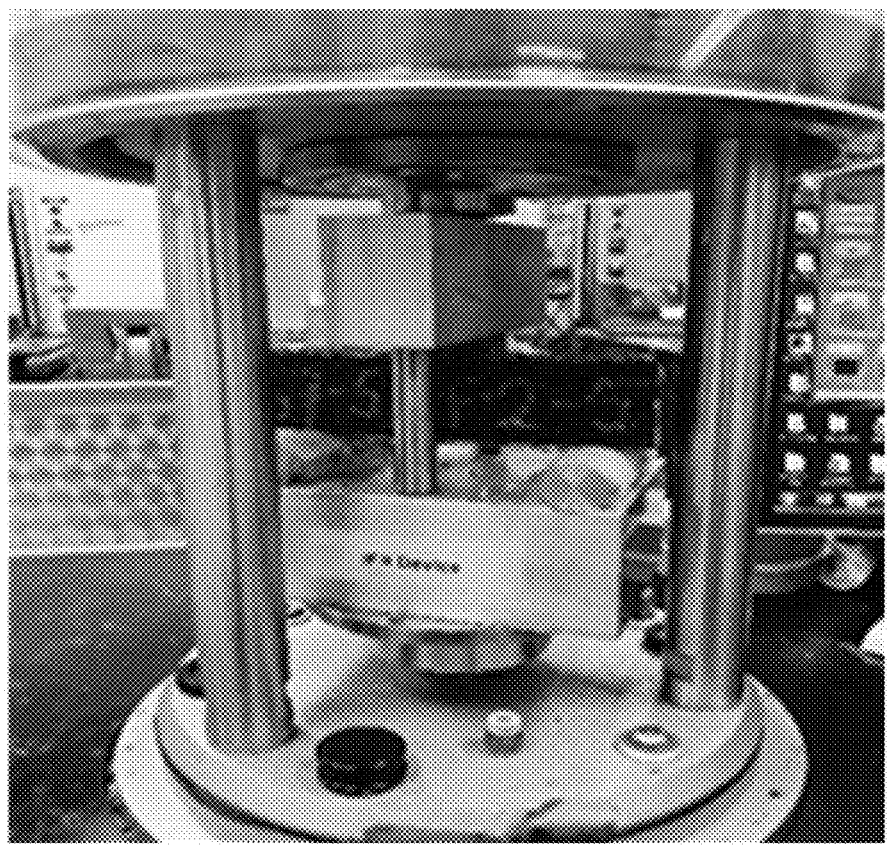

The objective of the self-healing experiment was to determine healing efficiency and strength recovery efficiency as a function of time (i.e., a healing period of 7 days). A 3-point-bending (3PB) test setup (FIG. 3B) was adopted from ASTM D 790 (2017) where the specimens were subjected to a strain-controlled monotonic loading until visible micro-cracks, which travelled throughout the entire thickness of the specimens, were observed. This experiment was performed at 25° C. using a span length of 100 mm and at a rate of 0.5 mm/min with no prior conditioning. The relatively slow loading rate was selected for eliminating any chance of sudden failure of the beams while testing.

The beam specimens were tested two times with the 3PB setup. Immediately after the first 3PB test, beams were kept horizontally on a flat surface and allowed to heal at two different curing conditions, room temperature and high temperature. High temperature curing was conducted in a forced air oven at 50° C. while room temperature curing was conducted by maintaining the temperature of the beams at 25° C. Digital image analysis was conducted to determine the healing efficiency over a healing period of 7 days. Using an optical light microscope, high-resolution images of the specimens were captured at day 0, 1, 3, 5, and 7 at a constant magnification level of 1.5×. The images obtained from light microscope were analyzed using ImageJ, a Java-based image-processing software, and the reduction in crack width over the healing period was measured. The healing efficiency at different healing periods was evaluated using the following equation:

$$H_e = \left(1 - \frac{c_{wt}}{c_{w0}}\right) * 100 \qquad (1)$$

where,
$H_e$=Healing efficiency (%);
$c_{wt}$=Initial crack width, mm; and
$c_{w0}$=Crack width at the time of analysis, mm.

The strength recovery was evaluated using two different strengths, i.e., damaged strength and healed strength. The strength obtained from the first 3PB test when micro-cracks were first introduced in the undamaged beam specimens represents the damaged strength. After healing, the specimens were again tested with 3PB setup to determine the healed strength. The strength recovery efficiency was calculated using the following equation:

$$S_e = \left(1 - \frac{S_o - S_t}{S_o}\right) * 100 \qquad (2)$$

where,
$S_e$=Strength Recovery Efficiency (%);
$S_o$=Strength in undamaged state, kN; and
$S_t$=Strength in healed state, kN.

Asphalt Mixture Performance Testing

A Semi-Circular Bending (SCB) test was performed in accordance with ASTM D 8044 (2016) to evaluate the fracture resistance of the asphalt mixtures with and without fibers at intermediate temperature (i.e., 25° C.). Full cylindrical specimens with a diameter of 150 mm and a height of 57 mm were prepared by compacting to an air void of 7.0±0.5%, cut into semi-circular specimens and kept in a forced air oven at 50° C. for 5 days. Finally, the specimens were notched to 25.4 mm, 31.8 mm and 38 mm notch depths and were tested to fracture under monotonic load at a constant deformation rate of 0.5 mm/min. The critical strain energy release rate, $J_c$, was calculated from the SCB test results using the following equation:

$$J_c = -\frac{1}{b} \cdot \frac{dU}{da} \qquad (3)$$

where,
$J_c$=Critical strain energy release rate (kJ/m$^2$);
b=Specimen thickness (mm); and $\frac{dU}{da}$ = Change of strain energy with notch depth(kJ/m).

Statistical Analysis

A statistical analysis consisting of an Analysis of Variance (ANOVA) and a Tukey's HSD test was conducted. ANOVA at a 95% confidence level was conducted to assess if the differences in performance obtained in the self-healing experiment and mixture testing results were statistically significant. The mixtures were ranked using letters A, B, C and so on, where A represents the best performer, B represents the second-best performer, and so on. Double letters (i.e., A/B, B/C), if present, meant that the mixture under evaluation can be categorized in both groups.

Binder Testing

Asphalt binders were recovered from the asphalt mixtures and the rutting and fatigue behavior was assessed using a series of rheological tests as described in the following sections.

Extraction of the Asphalt Binders

The asphalt binder-solvent solutions were extracted using an automated extraction equipment in accordance with ASTM D 8159 (2018) from the mixtures (Table 2) after an aging period of 5 days conducted as part of the SCB test. Binders were recovered from the extracted solutions containing asphalt binders and a solvent (i.e., trichloroethylene) by the Abson method (ASTM D1856). The solutions of asphalt binder and solvent were distilled under prescribed conditions until most of the solvent was distilled. Finally, carbon dioxide was permitted into the distillation process to eliminate all traces of trichloroethylene from the extracted solutions and asphalt binders were recovered.

Dynamic Shear Rheometer (DSR)

The Dynamic Shear Rheometer (DSR) test was performed at high and intermediate temperature following AASHTO T315 (2019) to determine the rutting and fatigue potential of the recovered binders. Asphalt binder specimens with a diameter of 25 mm and a thickness of 1 mm were sheared between one fixed and one moving plate at 10 rad/sec (1.59 Hz). The complex shear modulus (G*) and phase angle (δ) were determined from DSR test results.

Multiple Stress Creep Recovery Test

The Multiple Stress Creep Recovery (MSCR) test was performed at 67° C. on the extracted asphalt binders using DSR in accordance with AASHTO T 350 (2019). The purpose of this test was to characterize the extracted binder with respect to its rutting susceptibility using the non-recoverable creep compliance, Jnr (Angelo 2009; Hossain et al. 2016). MSCR was conducted at two stress levels (i.e., 0.1 kPa and 3.2 kPa) with 10 creep and recovery cycles at each stress level and the percent recovery, the non-recoverable creep compliance ($J_{nr}$), and $J_{nr}$ difference, were calculated. A higher percent recovery indicates an improved elastic behavior and a greater $J_{nr}$-value indicates a higher rutting susceptibility (Zhang et al. 2015).

Linear Amplitude Sweep Test

A pure linear amplitude sweep test, modified from the original LAS test by Zhou et al. (2017) was conducted using DSR to evaluate the fatigue performance of the extracted binders. An 8-mm parallel plate geometry with a 2-mm gap setting was used. This test was conducted at an average intermediate temperature of 27.2° C. and with three replicates from each binder. The experiment was performed using oscillatory shear in a strain-controlled mode at a frequency of 10 Hz. A continuous oscillatory strain sweep was used where the loading was increased linearly from 0 to 30% over 3,000 loading cycles. An alternative fatigue resistance parameter, referred to as the Fatigue Resistance Energy Index (FREI), was evaluated since it better correlates with fatigue resistance than the fatigue factor (G*sin δ) from the DSR and the fatigue performance parameter (Nr) from the LAS test. A larger value of FREI indicates a higher fatigue resistance and vice versa (Zhou et al. 2017). FREI was calculated according to the following equation:

$$FREI = \frac{J_{f-\tau_{max}}}{G_{0.5\tau_{max}}} \cdot \gamma_{0.5\tau_{max}} \quad (4)$$

where,
$J_{f-\tau_{max}}$=Shear fracture energy calculated until maximum shear stress;
$G_{0.5\tau_{max}}$=Calculated shear modulus at point of half of maximum shear stress; and
$\gamma_{0.5\tau_{max}}$=Shear strain at point of half of maximum shear stress.

Results and Analysis

Thermogravimetric Analysis

Figure 4A:
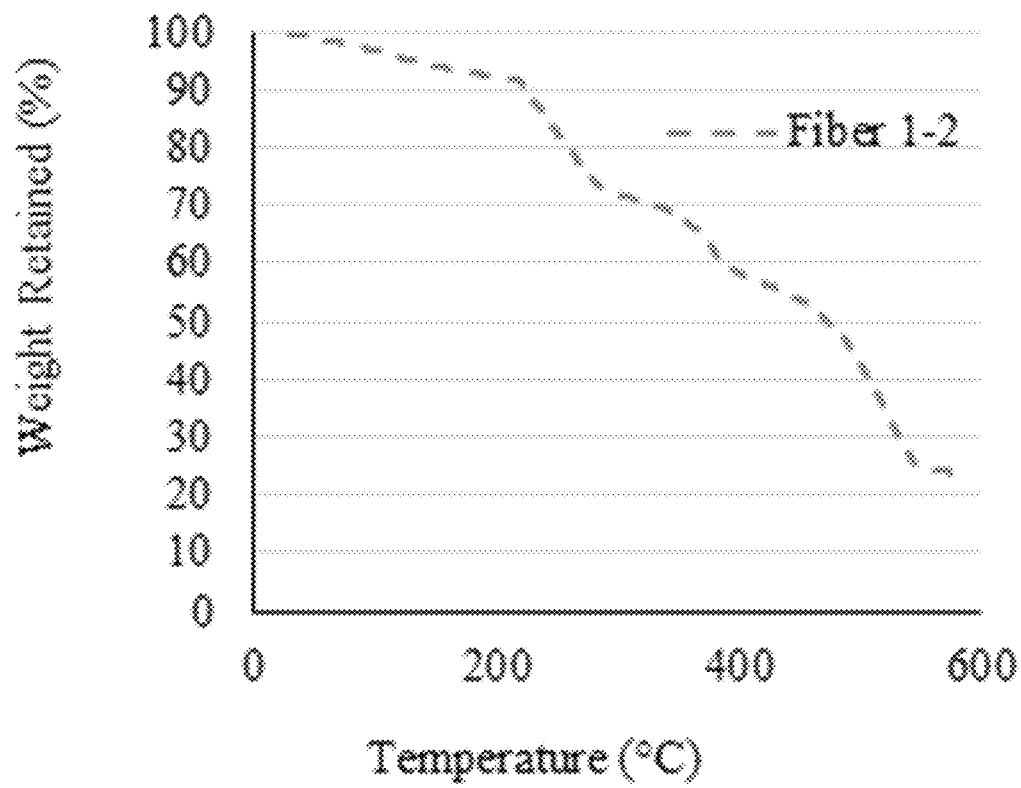
FIGS. 4A-4D are graphs illustrating TGA and tensile strength test results in accordance with embodiments of the present disclosure.
Figure 4B:
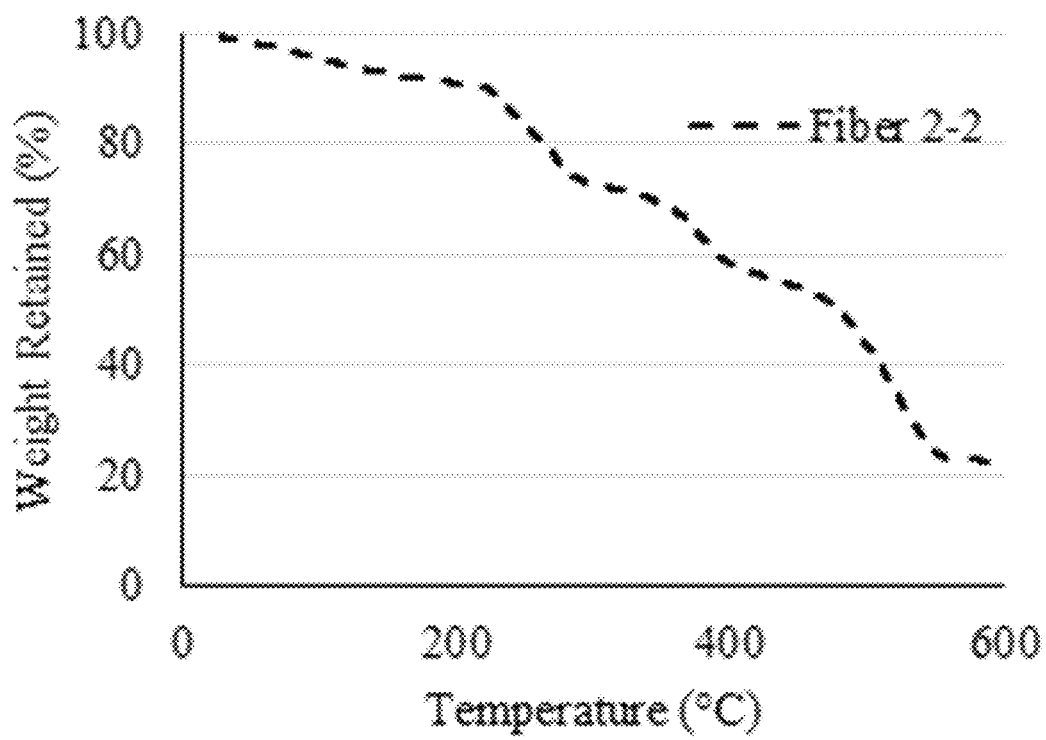

TGA results of the eleven fibers produced with Cargill-1252 showed that Fiber 1-2 retained 93.5% of its initial weight at 163° C. (FIG. 4A). Moreover, the percentage loss of weight at a temperature higher than the mixing temperature (i.e., 300° C.) was 28%, which was relatively low. Similarly, Fiber 2-2 among the eleven fibers with Cargill-1253 retained 92% of its initial weight at 163° C. with a weight loss of 27% at 300° C. (FIG. 4Bb). These results indicate that Fiber 1-2 and Fiber 2-2 both have the potential to exhibit acceptable thermal stability during the production of asphalt mixtures. The loss of weight at mixing temperature might be attributed to the evaporation of the absorbed water from the fibers during production; however, the loss of weight was low and can be considered as insignificant.

Tensile Strength Test

Figure 4C:
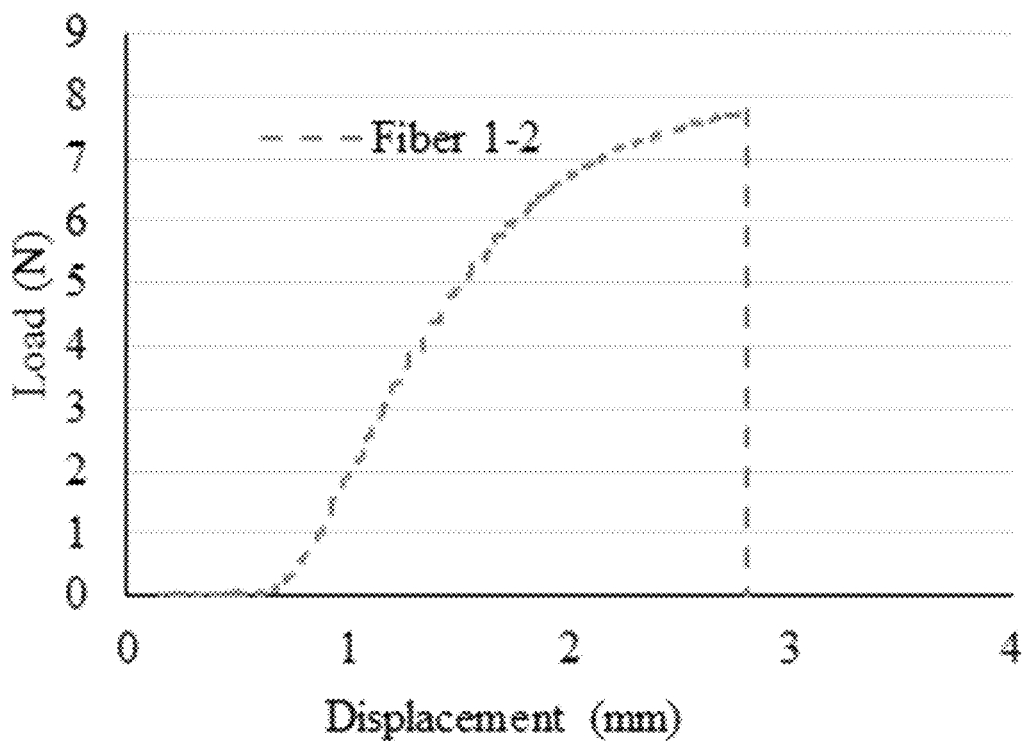
Figure 4D:
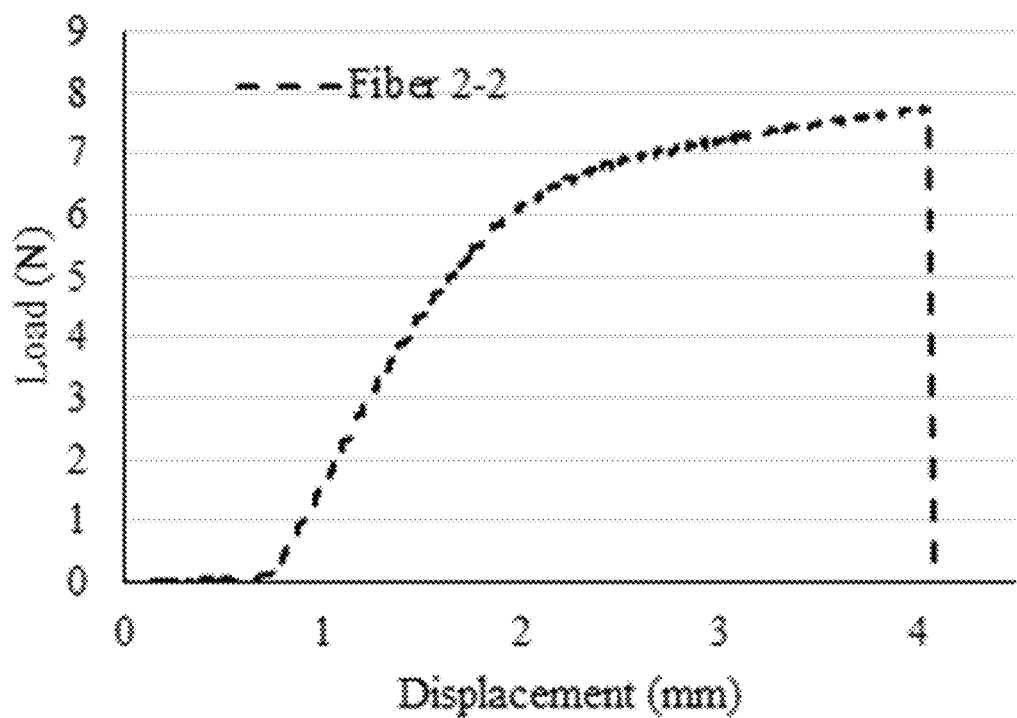

From previous studies, it was found that the fibers should exhibit a minimum UTS of 12 MPa to prevent breakage when subjected to tension during blending with asphalt mixture as well as for improving the elasticity of asphalt mixture (Bonnot 1997). Among the 11 fibers produced with Cargill-1252, Fiber 1-2 withstood an average maximum tensile load of 7.75 N before breaking (FIG. 4C). The corresponding average UTS of Fiber 1-2 was 23 MPa, which was above the threshold value. Similarly, Fiber 2-2 among the 11 fibers produced with Cargill-1253 provided an average UTS of 29.8 MPa (FIG. 4D). These results indicated that Fiber 1-2 and Fiber 2-2 possess adequate mechanical strength to withstand the HMA mixing and production processes.

Optimization of the Fiber Synthesis Parameters

Based on the results obtained from TGA analysis and tensile strength test, Fiber 1-2 and Fiber 2-2 were selected as the optimum fibers, which are expected to tolerate harsh environment during the production of asphalt mixture. Therefore, a rejuvenator to shell material ratio of 1:1.5 and a 40% emulsifier content were selected as the optimum production parameters during the synthesis of Fiber 2-1 and Fiber 2-2 for further testing and evaluation.

Self-Healing Experiment and Performance Test

Healing Efficiency

Figure 5A:
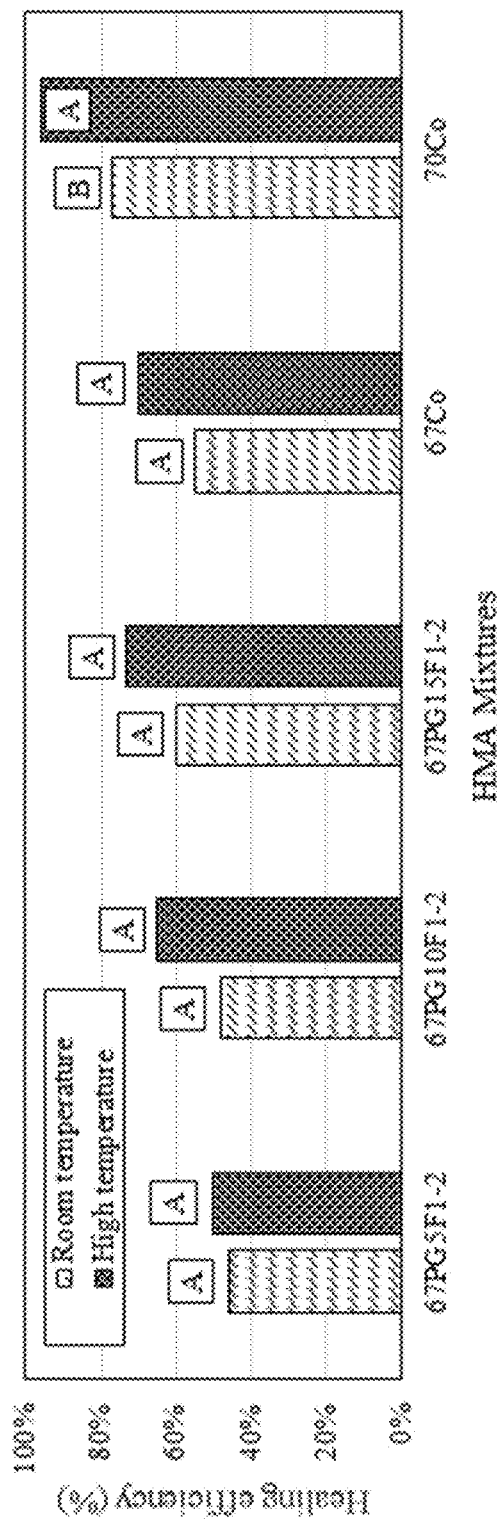
FIGS. 5A-5B provide healing efficiency results for (FIG. 5A) conventional mixtures and mixtures produced with Fiber 1-2, and (FIG. 5B) conventional mixtures and mixtures produced with Fiber 2-2 in accordance with embodiments of the present disclosure.

The healing efficiency of the asphalt mixtures was calculated using Equation (1). Results of the self-healing experiment for Fiber 1-2, which are presented in FIG. 5A, showed that the addition of 5% fiber content in the asphalt mixture (67PG5F1-2) resulted in a negative effect by decreasing the healing efficiency at both curing conditions as compared to 67CO. It is possible that the fibers did not break during testing, which explains the decrease in healing efficiency. Yet, the healing efficiency was enhanced with the increase in fiber content and was the highest at 15% fiber content (67PG15F1-2) for both room temperature and high temperature curing conditions (i.e., 60% and 73% respectively). However, results were statistically equivalent at both room temperature and high temperature curing as compared to 67CO.

Figure 5B:
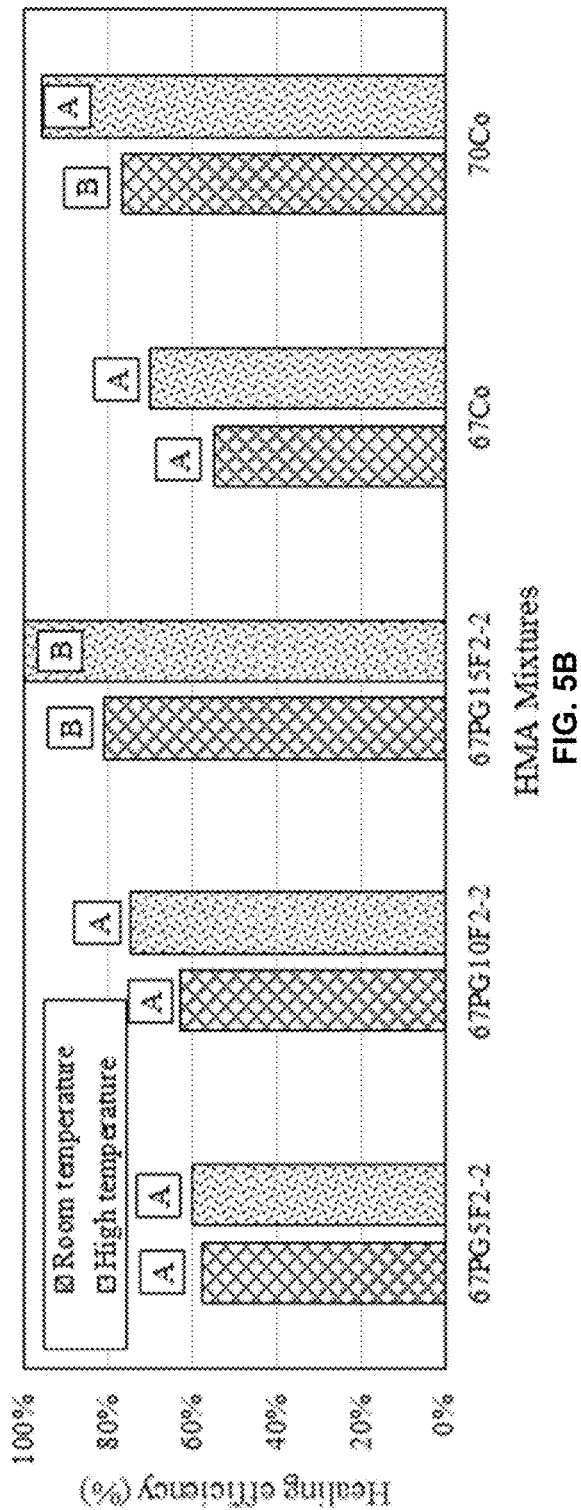

On the other hand, the incorporation of 5% Fiber 2-2 in the mixture (67PG5F2-2) caused a slight increase in healing efficiency at room temperature curing condition when compared to 67CO but the performances were statistically equivalent (FIG. 5B). The healing efficiency was enhanced with the increase in Fiber 2-2 content and was the highest at 15% fiber content (67PG15F2-2) for both curing conditions (i.e., 81% and 100% respectively). These differences were statistically significant for both room temperature and high temperature curing as compared to 67CO. It is also noted that 70CO had the highest healing efficiency at both curing conditions as compared to 67CO because of the use of polymer-modified binder. Moreover, for all the cases, the healing efficiency was enhanced at high temperature curing than in room temperature curing, which means that an increase in curing temperature increased the flow of the binder and enhanced the healing of cracks.

Figure 6A:
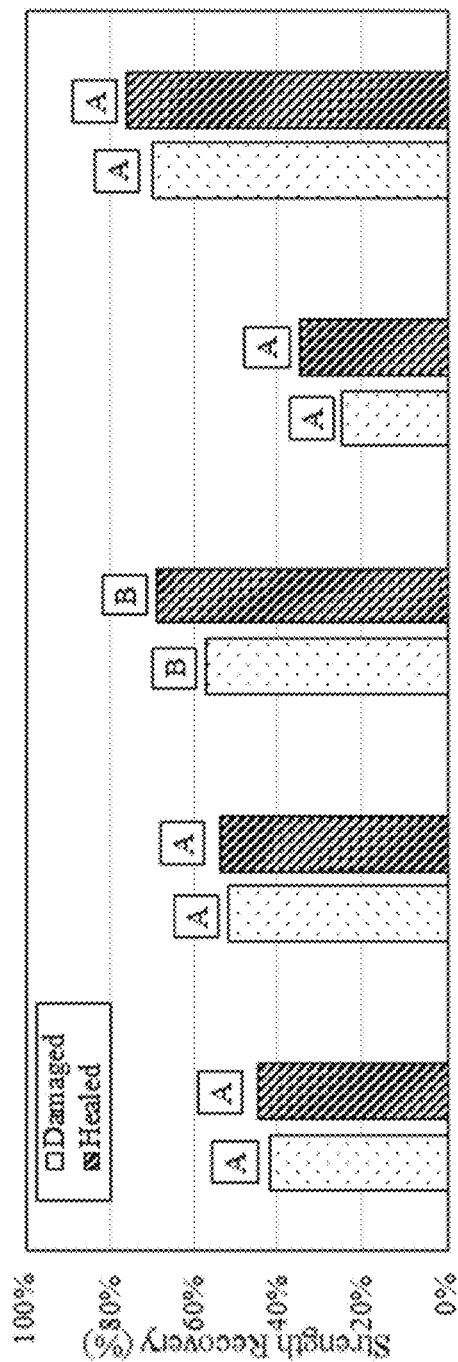
FIGS. 6A-6B provide strength recovery efficiency results for (FIG. 6A) conventional mixtures and mixtures produced with Fiber 1-2, and (FIG. 6B) conventional mixtures and mixtures produced with Fiber 2-2, in accordance with embodiments of the present disclosure.

The strength recovery efficiency of the prepared asphalt mixtures was evaluated based on Equation (2). From the strength recovery results, it was observed that the incorporation of fibers had a positive effect by causing an increase in strength recovery in both damaged and healed conditions when compared to 67CO (FIG. 6A). Similar to the healing efficiency, the strength recovery efficiency was enhanced with the increase in fiber content and the highest strength recovery was achieved at 15% fiber content (67PG15F1-2) for both damaged and healed conditions (i.e., 57% and 69%, respectively). Additionally, at 15% Fiber 1-2 content, the differences in performance were statistically significant in both the damaged and healed conditions as compared to 67CO.

Figure 6B:
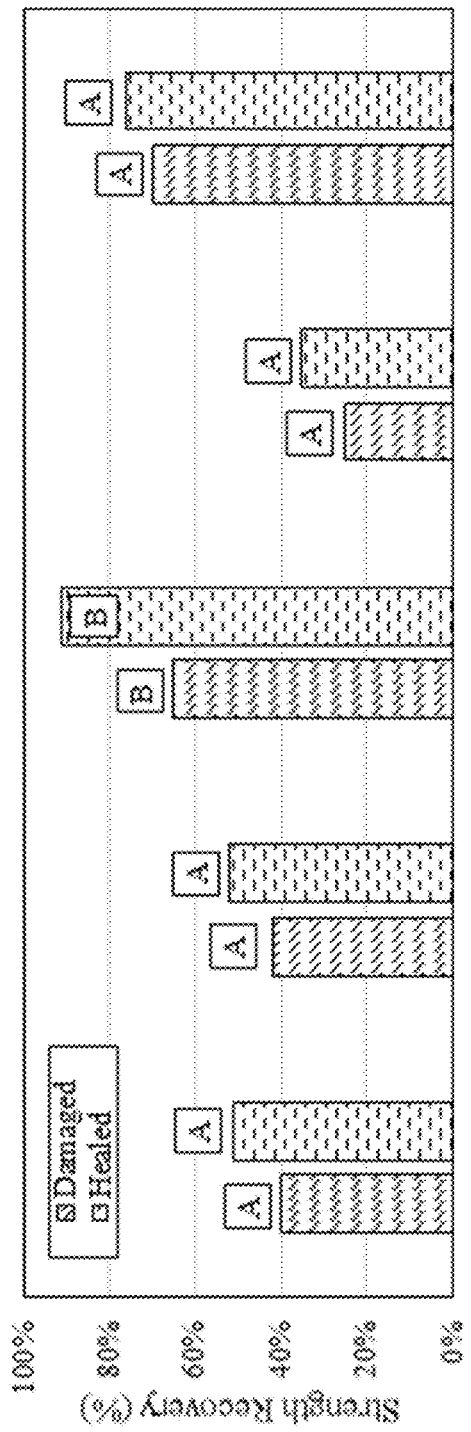

On the other hand, the addition of 5% and 10% Fiber 2-2 content showed similar strength recovery for both damaged and healed conditions (FIG. 6B). Similar to 67PG15F1-2, the mixture with 15% fiber content (67PG15F2-2) showed the highest strength recovery in both the damaged and healed conditions (i.e., 65% and 91%, respectively); the differences in performance were statistically significant as compared to 67CO.

Semi-Circular Bending (SCB) Test

Figure 7A:
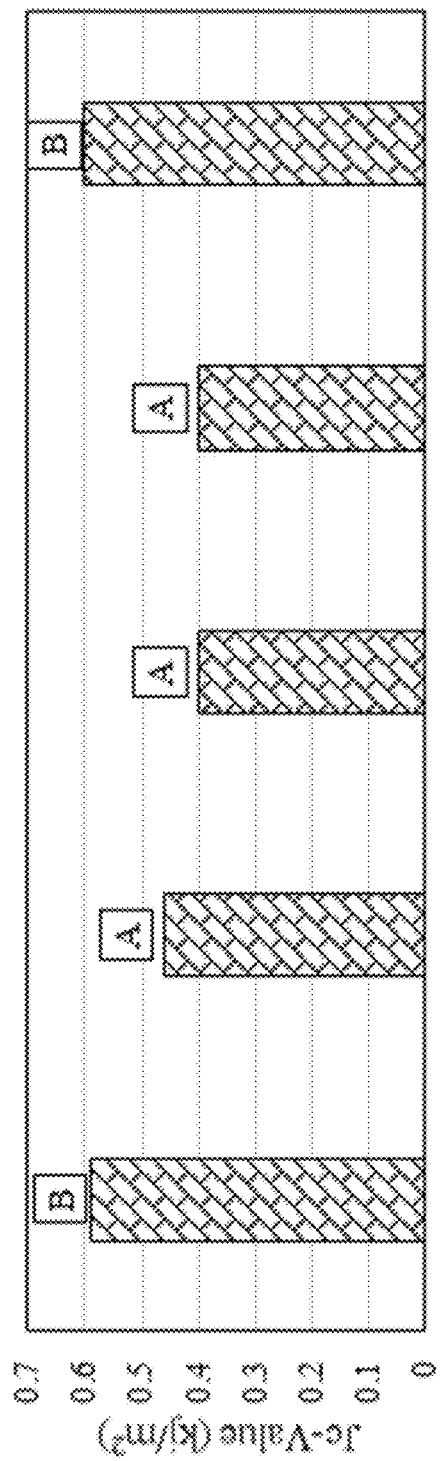
(FIG. 7A) conventional mixtures and mixtures produced with Fiber 1-2, and (FIG. 7B) conventional mixtures and mixtures produced with Fiber 2-2.
Figure 7B:
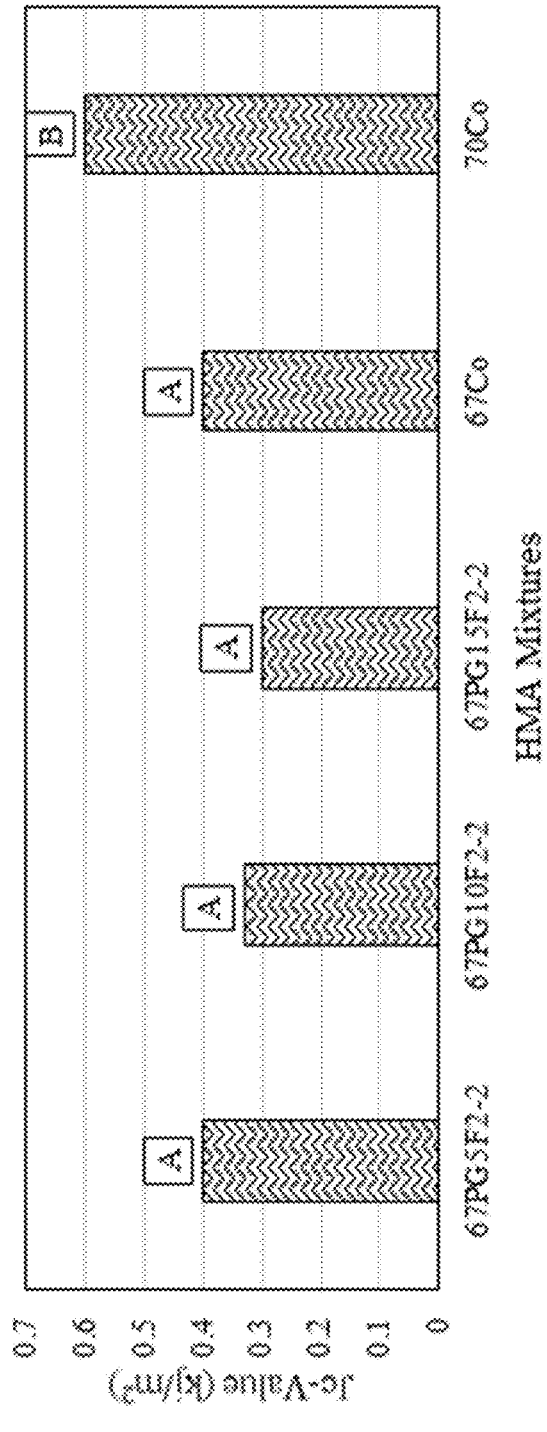

The critical strain energy release rate at intermediate temperature was calculated from the SCB test results using Equation (3). It was found from past studies that the mixtures should achieve a minimum threshold $J_c$ value of 0.5 kJ/m² to minimize intermediate-temperature cracking susceptibility (Wu et al. 2008). SCB test results showed that among the mixtures produced with Fiber F1-2, only 67PG5F1-2 satisfied the minimum threshold level of 0.5 kJ/m² (FIG. 7A). No mixtures prepared with Fiber 2-2 exhibited a $J_c$ value greater than 0.5 kJ/m² (FIG. 7B). From the SCB test results, a significant improvement in $J_c$ value was obtained at 5% Fiber 1-2 content (i.e., 67PG5F1-2); the differences in performance were statistically different as compared to 67CO. Yet, no significant improvement in $J_c$ value was observed at 5% Fiber 2-2 content (i.e., 67PG5F2-2) and the results were statistically equivalent as compared to 67CO. Overall, an increase in fiber content resulted in a negative effect by decreasing the $J_c$ value and it was the lowest at 15% fiber content for both fiber types (i.e., 0.4 kJ/m² for 67PG15F1-2 and 0.3 kJ/m² for 67PG15F2-2). These results indicate that the addition of more than 5% fiber increased the fracture susceptibility of the mixtures at intermediate temperature.

Binder Rheological Tests
Dynamic Shear Rheometer (DSR)

Results from the DSR showed that the rut factor (G*/sin δ) decreased with the increase in fiber content as compared to 67CO for both fiber types (Table 3). G*/sin δ is calculated in DSR through the application of an oscillating load to asphalt binder at relatively low shear strain in which the PEMA polymer network might not be activated. Moreover, the G*/sin δ can represent the viscoelastic behavior of the unmodified binder but may not capture the advantages of modification because δ has a relatively lower influence on G*/sin δ. Yet, 70CO exhibited the highest value of G*/sin δ because of using a SBS polymer modification. The values of the fatigue factor (G*.sin δ) were lower than 5000 kPa for all the binders, which met the Performance Grade (PG) specifications.

Multiple Stress Creep Recovery

The percent recovery analysis of the MSCR results indicated that at both stress levels, the percent recovery of the specimens increased at 5% fiber content and then decreased with an increase in fiber content for both fiber types as compared to 67CO (Table 4). For both fiber types, a 5% fiber content resulted in the highest percentage recovery at both stress levels. 67PG5F2-2 had higher percentage recovery than the percentage recovery from 67PG5F1-2 at both stress levels. This means that 67PG5F2-2 had improved elastic characteristics as compared to 67PG5F1-2 at the test temperature.

TABLE 4

MSCR Test Results.

| Blend type | % Recovery | | $J_{nr}$ (1/kPa) | | $J_{nr}$ |
|---|---|---|---|---|---|
| | 0.1 kPa | 3.2 kPa | 0.1 kPa | 3.2 kPa | Difference |
| 67CO | 11.24% | 3.35% | 1.22 | 1.43 | 17.21% |
| 67PG5F1-2 | 20.51% | 4.12% | 0.91 | 1.01 | 10.99% |
| 67PG10F1-2 | 12.34% | 3.17% | 1.12 | 1.56 | 39.29% |
| 67PG15F1-2 | 12.15% | 2.54% | 1.31 | 1.95 | 48.85% |
| 67PG5F2-2 | 26.12% | 4.29% | 0.79 | 1.4 | 31.65% |
| 67PG10F2-2 | 12.95% | 3.11% | 1.11 | 1.65 | 48.85% |
| 67PG15F2-2 | 11.53% | 2.90% | 1.50 | 2.32 | 54.67% |
| 70CO | 33.90% | 14.62% | 0.94 | 1.44 | 53.19% |

70CO exhibited a 34% recovery because the binder was an SBS polymer-modified binder. The addition of 5% fiber content caused a decrease in $J_{nr}$ for both fiber types at both stress levels. However, after that, $J_{nr}$ increased with the increase in fiber content at both stress levels. Asphalt binders with 5% fiber content (i.e., 67PG5F1-2 and 67PG5F2-2) had the lowest $J_{nr}$ at both stress levels, which indicates the highest rutting resistance. On the other hand, asphalt binders with 15% fiber content (i.e., 67PG15F1-2 and 67PG15F2-2) exhibited the highest $J_{nr}$ at both stress levels, which indicates the highest rutting potential. The $J_{nr}$ difference values for the binders with fibers were below 75% indicating that these binders may not be very sensitive to the variations in shear stress. Overall, $J_{nr}$ results showed that the incorporation of 5% fiber content increased the rutting resistance of the extracted binders and the binders with 5% fiber content exhibited the best performance against permanent deformation.

TABLE 3

DSR Results of the Extracted Binders.

| Test | Specification | Temp | 67CO | 67PG5F1-2 | 67PG10F1-2 | 67PG15F1-2 | 70CO |
|---|---|---|---|---|---|---|---|
| DSR (G*/sin δ) | >2.2 kPa | 64° C. | 5.01 kPa | 4.95 kPa | 4.41 kPa | 4.3 kPa | 5.71 kPa |
| DSR (G*/sin δ) | | 70° C. | 2.30 kPa | 2.47 kPa | 2.8 kPa | 1.87 kPa | 3.3 kPa |
| DSR (G*/sin δ) | | 76° C. | 1.9 kPa | 1.24 kPa | — | — | 1.8 kPa |
| DSR (G*.sin δ) | <5000 kPa | 31° C. | 2164 kPa | 915 kPa | 1079 kPa | 984 kPa | 1005 kPa |
| DSR (G*.sin δ) | | 28° C. | 3210 kPa | 1050 kPa | 2830 kPa | 1361 kPa | 2041 kPa |
| DSR (G*.sin δ) | | 25° C. | 4085 kPa | 1750 kPa | 3530 kPa | 2340 kPa | 2963 kPa |
| DSR (G*.sin δ) | | 22° C. | 5235 kPa | 2993 kPa | 4822 kPa | 3256 kPa | 3172 kPa |

| Test | Specification | Temp | 67CO | 67PG5F2-2 | 67PG10F2-2 | 67PG15F2-2 | 70CO |
|---|---|---|---|---|---|---|---|
| DSR (G*/sin δ) | >2.2 kPa | 64° C. | 5.01 kPa | 4.25 kPa | 4.32 kPa | 4.12 kPa | 5.71 kPa |
| DSR (G*/sin δ) | | 70° C. | 2.30 kPa | 2.24 kPa | 2.10 kPa | 1.65 kPa | 3.3 kPa |
| DSR (G*/sin δ) | | 76° C. | 1.9 kPa | 1.10 kPa | — | — | 1.8 kPa |
| DSR (G*.sin δ) | <5000 kPa | 31° C. | 2164 kPa | 947 kPa | 1107 kPa | 1087 kPa | 1005 kPa |
| DSR (G*.sin δ) | | 28° C. | 3210 kPa | 1235 kPa | 2316 kPa | 2586 kPa | 2041 kPa |
| DSR (G*.sin δ) | | 25° C. | 4085 kPa | 2431 kPa | 3711 kPa | 3174 kPa | 2963 kPa |
| DSR (G*.sin δ) | | 22° C. | 5235 kPa | 3015 kPa | 4312 kPa | 3983 kPa | 3172 kPa |

Figure 8A:
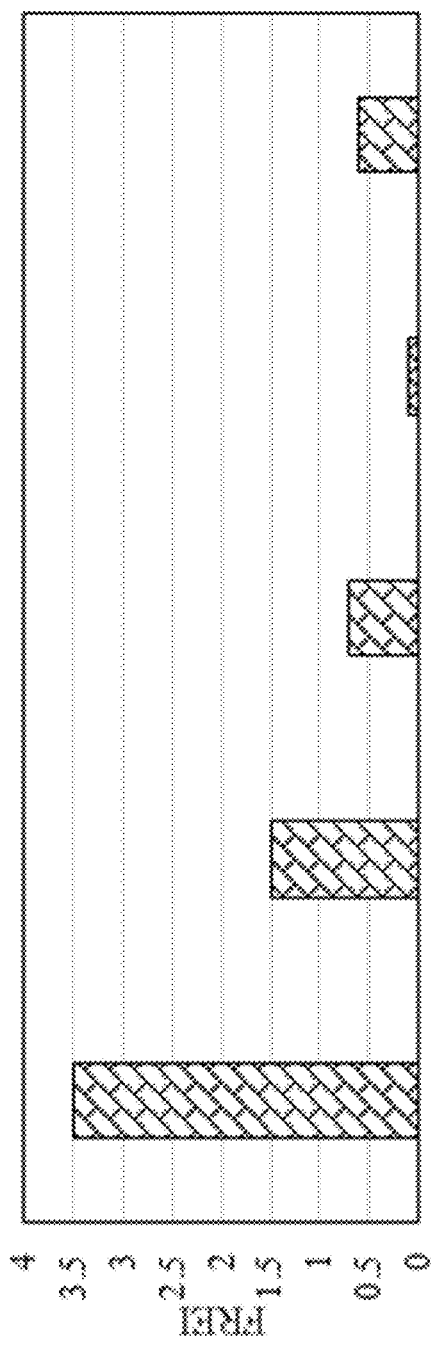
FIGS. 8A-8B provide FREI-values for (FIG. 8A) binders with F1-2, and (FIG. 8B) binders with F2-2, in accordance with embodiments of the present disclosure.
Figure 8B:
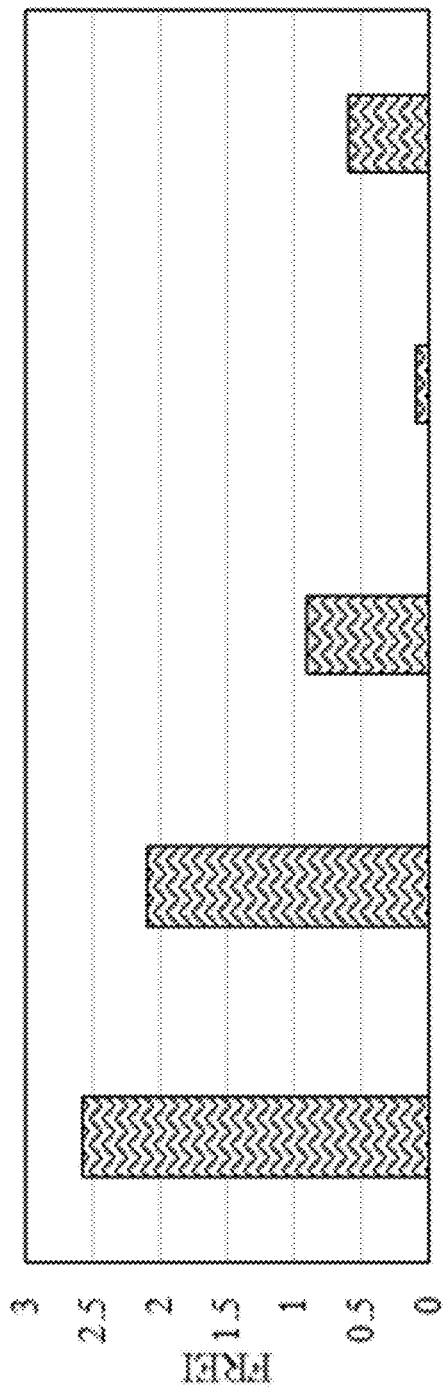

Results of the LAS test (FIGS. 6A-6B) showed that the addition of 5% fiber content resulted in the highest FREI-value as compared to 67CO for both fiber types. 67PG5F1-2 had the highest FREI-value of 3.5 (FIG. 8A) while for 67PG5F1-2, it was 2.5 (FIG. 8B), which indicates that the incorporation of 5% fiber content improved the elasticity of the binder and enhanced the resistance of the binders to fatigue cracking. The FREI-value decreased with the increase in fiber content and became lowest at 15% fiber content. However, increasing the fiber content means adding more rejuvenator, which would soften the binder and exhibit higher FREI-values (i.e., increased fatigue resistance). These results may due to the fibers, which were excessively strong and therefore, not all the fibers broke when the fiber content was above 5%, which explains the increase in fatigue potential with the increase in fiber content. The FREI-value was greater for 70CO than 67CO, which was still very low as compared with 67PG5F1-2 and 67PG5F2-2.

SUMMARY AND CONCLUSION

The objectives of this study were to evaluate the effect of two sodium alginate fibers on asphalt mixtures in order to enhance the self-healing capability and to assess the rutting and fatigue resistances of the extracted binders through various binder tests. The findings and conclusions of the study were as follows:

Enhancement of healing efficiency and strength recovery efficiency: Results of the self-healing experiment showed that the addition of sodium alginate fibers at 15% enhanced both the healing efficiency and strength recovery of the asphalt mixtures for both fiber types. Overall, the healing efficiency and strength recovery were enhanced with the increase in fiber content as compared to the conventional mixture.

The healing efficiency for both fiber types was higher at high temperature curing than at room temperature curing. Similarly, the strength recovery for the healed condition was higher than for the damaged condition.

Enhancement of fracture properties: The highest $J_c$ value was obtained at 5% fiber content for both fiber types. Asphalt mixture with 5% Fiber 1-2 content exhibited a significant improvement in $J_c$ value as compared to the conventional mixture. However, an increase in fiber content resulted in a negative effect by decreasing the $J_c$ value for both fiber types.

For the mixtures prepared with the unmodified asphalt binder, the mixture prepared with 5% fiber F1-2 was the only mixture that satisfied the minimum threshold level of 0.5 kJ/m$^2$.

Enhancement of rutting and fatigue resistances of the extracted binders: According to $J_{nr}$ results, asphalt binders with 5% fiber content exhibited the highest resistance to rutting. Additionally, asphalt binder with Fiber 1-2 exhibited a more elastic behavior than the binder blends prepared with Fiber 1-1.

From the results of the LAS test, it was observed that asphalt binders with 5% fiber content exhibited the best performance against fatigue cracking. The resistance to fatigue cracking of the asphalt binders decreased with the increase in fiber content.

Based on the results of this study, the use of 5% Fiber 1-2 seems to be a promising level of sodium alginate fibers encapsulating rejuvenators to enhance the healing efficiency of asphalt mixtures. The fibers described herein may also be used to improve the self-healing efficiency of asphalt mixtures produced with RAP and RAS by incorporating sodium alginate fibers in various contents as can be envisioned by one of ordinary skill in the art.

REFERENCES

AASHTO (The American Association of State Highway and Transportation Officials). 2017. AASHTO R35: *Standard Practice for Superpave Volumetric Design for Asphalt Mixtures.*

AASHTO (The American Association of State Highway and Transportation Officials). 2017. AASHTO M323: *Standard Specification for Superpave Volumetric Mix Design.*

AASHTO (The American Association of State Highway and Transportation Officials). 2019. AASHTO T 315: *Determining the Rheological Properties of Asphalt Binder Using a Dynamic Shear Rheometer (DSR).*

AASHTO (The American Association of State Highway and Transportation Officials). 2019. AASHTO T 350: *Standard Method of Test for Multiple Stress Creep Recovery (MSCR) Test of Asphalt Binder Using A Dynamic Shear Rheometer (DSR).*

Aguirre, M. A., Hassan, M. M., Shirzad, S., Cooper Jr, S., Mohammad, L. N., and Negulescu, I. I. 2019. Laboratory Testing of Self-Healing Fibers in Asphalt Mixtures Prepared with Recycled Materials. *Transportation Research Record: Journal of the Transportation Research Board,* 2673, 513-525.

Aguirre, M. A., Hassan, M. M., Shirzad, S., Mohammad, L. N., Cooper Jr, S., and Negulescu, I. 2018. Evaluation of Hollow-Fibers Encapsulating a Rejuvenator in Asphalt Binders with Recycled Asphalt Shingles. *International Journal of Pavement Research and Technology,* 1-12.

Aguirre, M. A., Hassan, M. M., Shirzad, S., Mohammad, L., and Cooper Jr, S. 2017. Performance of Asphalt Rejuvenators in Hot-Mix Asphalt Containing Recycled Asphalt Shingles. *Transportation Research Record: Journal of the Transportation Research Board,* 2633 (1), 108-16.

Angelo, J. A. D. 2009. "The Relationship of the MSCR Test to Rutting." *Road Materials and Pavement Design,* 10, 61-80.

ASTM (American Society for Testing and Materials). 2009. ASTM D1856: *Standard Test Method for Recovery of Asphalt from Solution by Abson Method.*

ASTM (American Society for Testing and Materials). 2016. ASTM D8044: *Standard Test Method for Evaluation of Asphalt Mixture Cracking Resistance using the Semi-Circular Bend Test (SCB) at Intermediate Temperatures.*

ASTM (American Society for Testing and Materials). 2017. ASTM D790: *Standard Test Method for Flexural Properties of Unreinforced and Reinforced Plastics and Electrical Insulation Materials.*

ASTM (American Society for Testing and Materials). 2018. ASTM D8159: *Standard Test Methods for Quantitative Extraction of Asphalt Binder from Asphalt.*

ASTM (American Society for Testing and Materials). 2019. ASTM D8159: *Standard Test Method for Automated Extraction of Asphalt Binder from Asphalt Mixtures.*

Bonnot, J. 1997. Selection and use of the procedures for laboratory compaction of bituminous mixtures. In *Proceedings of the Performance Related Test Procedures for Bituminous Mixtures.*

Brown, E. R. 1988. Preventive Maintenance of Asphalt Concrete Pavements. NCAT Report No. 88-1.

Garcia, A., Austin, C. J., and Jelfs, F. J. 2016. Mechanical Properties of Asphalt Mixture Containing Sunflower Oil Capsules. *Journal of Cleaner Production,* 118, 124-132.

Garcia, A., Jelfs, J., and Austin, C. J. 2015. Internal Asphalt Mixture Rejuvenation using Capsules. *Construction and Building Materials*, 101, 309-316.

García, Á., Schlangen, E., and Van de Ven, M. 2011. Properties of Capsules Containing Rejuvenators for their use in Asphalt Concrete. *Fuel*, 90, 583-591.

García, Á., Schlangen, E., van de Ven, M., and Sierra-Beltrán, G. 2010. Preparation of Capsules Containing Rejuvenators for their use in Asphalt Concrete. *Journal of Hazardous Materials*, 184, 603-611.

Hassan, M., and Aguirre, M. 2018. Development of a Self-Healing and Rejuvenating Mechanism for Asphalt Mixtures Containing Recycled Asphalt Materials, Final Report 17BLSU06, Tran-SET.

Hossain, Z., Ghosh, D., Zaman, M., and Hobson, K. 2016. Use of the Multiple Stress Creep Recovery (MSCR) Test Method to Characterize Polymer-Modified Asphalt Binders. *Journal of Testing and Evaluation*, 44 (1): 507-520.

LADOTD (Louisiana Department of Transportation and Development). 2006. Louisiana Standard Specification for Roads and Bridges, 209-242.

Mookhoek, S. D., Fischer, H. R., and van der Zwaag, S. 2012. Alginate Fibres Containing Discrete Liquid Filled Vacuoles for Controlled Delivery of Healing Agents in Fibre Reinforced Composites. *Composites Part A: Applied Science and Manufacturing*, 43, 2176-2182.

Shen, J., Amirkhanian, S., and Aune Miller, J. 2007. Effects of Rejuvenating Agents on Superpave Mixtures Containing Reclaimed Asphalt Pavement. *Journal of Materials in Civil Engineering*, 19, 376-384.

Shu, B., Bao, S., Wu, S., Dong, L., Li, C., Yang, X., and Wang, Q. 2019. Synthesis and Effect of Encapsulating Rejuvenator Fiber on the Performance of Asphalt Mixture. *Materials*, 12, 1-12.

Su, J. F., Qiu, J., and Schlangen, E. Stability Investigation of Self-Healing Microcapsules Containing Rejuvenator for Bitumen. 2013. *Polymer Degradation and Stability*, 98, 1205-1215.

Tabaković, A., Braak, D., van Gerwen, M., Copuroglu, O., Post, W., Garcia, S. J., and Schlangen, E. 2017. The Compartmented Alginate Fibres Optimisation for Bitumen Rejuvenator Encapsulation. *Journal of Traffic and Transportation Engineering (English Edition)*, 4, 347-359.

Tabaković, A., Post, W., Cantero, D., Copuroglu, O., Garcia, S. J., and Schlangen, E. J. S. M. S. 2016. The Reinforcement and Healing of Asphalt Mastic Mixtures by Rejuvenator Encapsulation in Alginate Compartmented Fibres. *Smart Materials and Structures*, 25, 1-12.

Tabaković, A., Schuyffel, L., Karač, A., and Schlangen, E. 2017. An Evaluation of The Efficiency of Compartmented Alginate Fibres Encapsulating a Rejuvenator as an Asphalt Pavement Healing System. *Applied Sciences*, 7, 1-16.

Wu, Z., Mohammad, L. N., Wang, L. B., and Mull, M. A. 2005. Fracture Resistance Characterization of Superpave Mixtures using the Semi-Circular Bending Test. *Journal of ASTM International*, 2, 1-15.

Xu, S., Tabaković, A., Liu, X., and Schlangen, E. 2018. Calcium Alginate Capsules Encapsulating Rejuvenator as Healing System for Asphalt Mastic. *Construction and Building Materials*, 169, 379-387.

Xue, B., Wang, H., Pei, J., Li, R., Zhang, J., and Fan, Z. 2017. Study on Self-Healing Microcapsule Containing Rejuvenator for Asphalt. *Construction and Building Materials*, 135, 641-649.

Zhang, Jun, Walubita, L. F., Faruk, A. N. M., Karki, P., and Simate, G. S. 2015. Use of the MSCR Test to Characterize the Asphalt Binder Properties Relative to HMA Rutting Performance—A Laboratory Study. *Construction and Building Materials*, 94, 218-27.

Zhang, X. L., Su, J. F., Guo, Y. D., Wang, X. Y., Fang, Y., Ding, Z., and Han, N. X. 2018. Novel Vascular Self-Nourishing and Self-Healing Hollow Fibers Containing Oily Rejuvenator for Bitumen. *Construction and Building Materials*, 183, 150-162.

Zhou, F., Karki, P., and Im, S. Development of a Simple Fatigue Cracking Test for Asphalt Binders. 2017. *Transportation Research Record: Journal of the Transportation Research Board*, 2632, 79-87.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

What is claimed is:

1. Asphalt rejuvenating hollow fibers, comprising:
    a shell surrounding a hollow space, where the shell comprises one or more alginate salts, an emulsifier, and a plasticizer.

2. The asphalt rejuvenating hollow fibers of claim 1, wherein the one or more alginate salts comprise sodium alginate, calcium alginate, or a combination thereof.

3. The asphalt rejuvenating hollow fibers of claim 1, further comprising a core material disposed in the hollow space so that it is encapsulated by the shell; and
    wherein the core material comprises a rejuvenator.

4. The asphalt rejuvenating hollow fibers of claim 3, wherein a ratio of rejuvenator to shell is about 1:1.5 to 3:1, or about 1:1.5.

5. The asphalt rejuvenating hollow fibers of claim 3, wherein the rejuvenator is an aromatic oil or a bio-oil.

6. The asphalt rejuvenating hollow fibers of claim 1, wherein the shell further comprises a rejuvenator.

7. The asphalt rejuvenating hollow fibers of claim 1, comprising about 30% to 50% emulsifier content, and about 10% to 40% plasticizer content.

8. The asphalt rejuvenating hollow fibers of claim 1, wherein the emulsifier is selected from the group consisting of: poly(ethylene-alt-maleic anhydride), poly(olefin-maleic anhydride), poly(olefin-maleic acid), poly(acrylic acid), poly(isobutylene-alt-maleic anhydride), and styrene-maleic anhydride.

9. The asphalt rejuvenating hollow fibers of claim 1, wherein the plasticizer is selected from the group consisting of: polyethylene glycol, glycerin, polyethylene glycol monomethyl ether, sorbitol sorbitan solution, and cellulose acetate.

10. The asphalt rejuvenating hollow fibers of claim 1, wherein the asphalt rejuvenating fibers have a mean fiber diameter of about 25 µm to 450 µm and a length of about 5 mm to 70 mm.

11. An asphalt rejuvenation self-healing mixture, comprising a plurality of asphalt rejuvenating hollow fibers of claim 1, an asphalt binder, and aggregate blends.

12. The asphalt rejuvenation self-healing mixture of claim 11, wherein the asphalt rejuvenating hollow fibers comprise about 1% to 40% by weight of the asphalt binder.

13. The asphalt rejuvenation self-healing mixture of claim 11, wherein the asphalt rejuvenating hollow fibers comprise about 5% to 12% by weight of the asphalt binder.

14. The asphalt rejuvenation self-healing mixture of claim 11, wherein the binder has a rotational viscosity of less than 3.0 Pascal second, a permanent deformation expressed by $(G^*/\sin\delta)>1000$ Pascal for an unaged binder, and $(G^*/\sin\delta)>2200$ Pascal for a short-term aged binder, a fatigue cracking performance expressed by $(G^*\sin\delta)<5000$ kiloPascal for a long term aged binder, and a low temperature cracking resistance expressed by low temperature stiffness and relaxation of the binder, measured by a flexural creep stiffness at 60 seconds <300 MegaPascal and a slope of a master stiffness curve at 60 seconds (m-value) of >0.3.

15. The asphalt rejuvenation self-healing mixture of claim 14, wherein the binder is selected from PG 64-22, PG 67-22, and polymer-modified PG 70-22.

16. The asphalt rejuvenation self-healing mixture of claim 11, wherein the mixture includes Recycled Asphalt Shingles (RAS) or Recycled Asphalt Pavement (RAP).

* * * * *